(12) United States Patent
Schwab et al.

(10) Patent No.: US 9,377,322 B2
(45) Date of Patent: Jun. 28, 2016

(54) METHOD FOR OPERATING AN OPTICAL DISPLAY DEVICE OF A VEHICLE

(71) Applicant: Bayerische Motoren Werke Aktiengesellschaft, Munich (DE)

(72) Inventors: Axel Schwab, Munich (DE); Wolfgang Rieger, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/593,816

(22) Filed: Jan. 9, 2015

(65) Prior Publication Data

US 2015/0127255 A1 May 7, 2015

Related U.S. Application Data

(63) Continuation of application No. PCT/EP2013/063793, filed on Jul. 1, 2013.

(30) Foreign Application Priority Data

Jul. 10, 2012 (DE) .......................... 10 2012 212 016

(51) Int. Cl.
*G01C 21/00* (2006.01)
*G01C 21/36* (2006.01)
*G02B 27/01* (2006.01)

(52) U.S. Cl.
CPC ............... *G01C 21/365* (2013.01); *G02B 27/01* (2013.01); *G09G 2380/10* (2013.01)

(58) Field of Classification Search
USPC ................................... 701/400, 438, 532–533
See application file for complete search history.

(56) References Cited

U.S. PATENT DOCUMENTS

| | | | |
|---|---|---|---|
| 7,605,773 B2 | 10/2009 | Janssen | |
| 7,925,982 B2 | 4/2011 | Parker et al. | |
| 2011/0093190 A1 | 4/2011 | Yoon | |
| 2012/0146809 A1 | 6/2012 | Oh et al. | |
| 2012/0174004 A1 | 7/2012 | Seder et al. | |
| 2012/0245842 A1* | 9/2012 | Spindler | G01C 21/3638 701/438 |
| 2012/0245849 A1* | 9/2012 | Spindler | G01C 21/32 701/533 |

FOREIGN PATENT DOCUMENTS

| | | |
|---|---|---|
| DE | 101 32 043 A1 | 1/2003 |
| DE | 10 2004 014 671 A1 | 10/2005 |
| DE | 10 2007 058 437 A1 | 6/2009 |
| DE | 10 2008 042 734 A1 | 4/2010 |

(Continued)

OTHER PUBLICATIONS

International Search Report dated Oct. 1, 2013 (Two (2) pages).

(Continued)

*Primary Examiner* — Yonel Beaulieu
(74) *Attorney, Agent, or Firm* — Crowell & Moring LLP

(57) ABSTRACT

A dataset is determined as a function of a specified navigation information, where the dataset includes a specified metadata structure which is suitable for textually characterizing the navigation information. The dataset is transmitted by way of a specified communication interface. As a function of the dataset received by way of the communication interface, pixel values are determined for at least a portion of pixels of a digital image and/or of a graphic element. Furthermore, a signalization signal is determined for signalizing the pixel values of the pixels by means of the optical display device.

12 Claims, 2 Drawing Sheets

(56) References Cited

FOREIGN PATENT DOCUMENTS

| | | |
|---|---|---|
| DE | 10 2010 003 850 A1 | 10/2011 |
| EP | 0 643 315 A1 | 3/1995 |
| EP | 1 118 838 A2 | 7/2001 |
| EP | 1 916 645 A1 | 4/2008 |
| EP | 2 159 541 A1 | 3/2010 |
| FR | 2 862 380 A1 | 5/2005 |
| WO | WO 2008/078187 A2 | 7/2008 |
| WO | WO 2011/015843 A2 | 2/2011 |

OTHER PUBLICATIONS

German Search Report dated May 29, 2013, with Statement of Relevancy (Five (5) pages).

* cited by examiner

METHOD FOR OPERATING AN OPTICAL DISPLAY DEVICE OF A VEHICLE

CROSS REFERENCE TO RELATED APPLICATIONS

This application is a continuation of PCT International Application No. PCT/EP2013/063793, filed Jul. 1, 2013, which claims priority under 35 U.S.C. §119 from German Patent Application No. 10 2012 212 016.5, filed Jul. 10, 2012, the entire disclosures of which are herein expressly incorporated by reference.

BACKGROUND AND SUMMARY OF THE INVENTION

The invention relates to a method of operating an optical display device as well as to a data determination unit, an image determination unit as well as to a display system for a vehicle for implementing the method.

Current motor vehicles have different control units which are designed for implementing different vehicle functions. Functions for informing the driver are implemented, for example, in an instrument cluster. Functions for the navigation are carried out by another control unit, such as a head-up unit. Displays for navigation and for informing the driver predominantly take place by means of different optical display devices which are directly assigned to the control units. Driver information, for example, is displayed by means of an instrument cluster, and navigation information is displayed by means of a central vehicle display.

It is an object of the invention to create a method of operating an optical display device as well as a data determination unit, an image determination unit and a display system for a vehicle, which permit an efficient providing of the data necessary for generating images in the vehicle and/or an efficient generating of images.

This object is achieved by the characteristics of the independent claims. Advantageous embodiments of the invention are characterized in the subclaims.

According to a first aspect, the invention is characterized by a method of operating an optical display device of a vehicle. Here a dataset is determined as a function of a specified navigation information, the dataset having a specified metadata structure which is suitable for textually characterizing the navigation information. The dataset is transmitted by way of a specified communication interface. As a function of the dataset received by way of the communication interface, pixel values are determined for at least a portion of pixels of a digital image and/or graphic element. Furthermore, a signalization signal is determined for signaling the pixel values of the pixels by means of the optical display device.

This has the advantage that information, particularly the navigation information, for which a signalization signal is normally generated and provided, which graphically and/or pictorially characterizes the information, can be converted to the datasets having the metadata structure. These datasets can be efficiently transmitted and then utilized at a different location for the image generation. Advantageously, this makes it possible to efficiently transmit the information, particularly the navigation information. A transmission bandwidth can be reduced in comparison to a transmission of the navigation information in the form of plot commands. This can contribute to the fact that, despite a limited transmission bandwidth, a display of the navigation information can take place in a qualitatively valuable manner. The image generation can take place in a single processing unit in the vehicle. It is not necessary that images are generated at different locations, i.e. in different processing units of the vehicle, for example, in the head unit and in an instrument cluster, which are subsequently combined in one of the two processing units. It is sufficient for the data required for an image syntheses, also called "rendering", to be made available to only the one processing unit. The image generation by the one processing unit simplifies a consistent image generation. In particular, in the case of a high-expenditure three-dimensional representation, it becomes possible to determine conclusive and valuable display contents. The metadata structure of the datasets permits an easier and/or more reliable and/or more precise determination of the pixel values, particularly in the case of the high-expenditure three-dimensional representation. The metadata structure of the datasets can contribute to a more precise description of logical operations. In the case of a display with high real-time demands, particularly for a contact-analogous representation with a head-up display, the performance demands on the processing unit implementing the image synthesis are very high. The image generation in only the one processing unit for a contact-analogous head-up display relieves further processing units, for example, the processor in the navigation unit, and permits a display prioritization as a function of the driving situation of all contents in the head-up display in real time.

In an advantageous further development of the first aspect, the navigation information comprises a driving instruction for a vehicle user. This has the advantage that the driving instruction which has a predictive character, can be easily and reliably determined and signaled in real time.

In a further advantageous development of the first aspect, as a function of specified route data and/or specified environment data, a three-dimensional model is determined for a specified environment of the vehicle, and the pixel values for the at least one portion of the pixels of the digital image and/or of the graphic element are determined as a function of the three-dimensional model. This has the advantage that the three-dimensional model can be determined in a very precise and reliable manner, and the pixel values can therefore be determined such that a display of the image and/or of the graphic element can take place that is of a high quality.

In a further advantageous development of the first aspect, the optical display device comprises a head-up display with a specified display field. The pixel values of the graphic elements are determined such, as a function of the dataset and the three-dimensional model, and are displayed on the display field that a viewer of the display field perceives the graphic element from a specified viewing position with a direct reference to the real environment of the vehicle. An embedding and/or superimposing of the graphic element as virtual information in or onto a real environment perceived by the driver makes it possible that a predictive character of the information, particularly of the driving instruction, can be perceived by the vehicle driver in an easy, reliable and comprehensible manner.

According to a second aspect, the invention is characterized by a data determination unit which is designed for determining a dataset as a function of a specified navigation information, the dataset having a specified metadata structure which is suitable for textually characterizing the navigation information. The data determination unit is further designed for sending the dataset by way of a specified communication interface.

In this case, advantageous further developments also apply to the second aspect. Advantageously, the providing of the navigation information by means of the dataset with the metadata structure makes it possible that the data determination unit can be equipped with lower processing power and/or a transmission bandwidth of the communication interface can be kept at a minimum.

According to a third aspect, the invention is characterized by an image determination unit, which can be coupled with respect to signals with an optical display device of the vehicle and which is designed for receiving a specified dataset, which is transmitted by way of a specified communication interface. Furthermore, the image determination unit is designed, as a function of the received dataset, for determining pixel values for at least a portion of the pixels of a digital image and/or of a graphic element and determining a signalization signal for signaling the pixel values of the pixels by means of the optical display device.

It is sufficient that the data required for the image synthesis, particularly the datasets, are made available only to the image determination unit. The image generation by the image determination unit simplifies the consistent image generation.

The image generation for a contact-analogous head-up display requires very high processing power because of the high real-time demand of this display. The image determination unit can be equipped with sufficiently high processing power, which permits the image generation for a contact-analogous head-up display of sufficient quality.

In an advantageous further development of the third aspect, the image determination unit is designed for determining, as a function of specified route data and/or specified environment data, a three-dimensional model for a specified environment of the vehicle. The image determination unit is further designed for determining the pixel values for the at least one portion of the pixels of the digital image and/or of the graphic element as a function of the three-dimensional model.

In a further advantageous development of the third aspect, the optical display device comprises a head-up display having a specified display field, and the image determination unit is designed for determining the pixel values of the graphic element as a function of the dataset and the three-dimensional model and displaying them on the specified display field of the head-up display such that the graphic element is perceived by a viewer of the display field from a specified viewing position with a direct reference to the real environment of the vehicle.

Supplementary advantageous further developments of the first aspect also apply to the third aspect.

According to a fourth aspect, the invention is characterized by a display system for a vehicle which has a data detection unit according to the second aspect. The display system further has an image determination unit according to the third aspect. Furthermore, the display system comprises a specified communication interface which couples the data determination unit and the image determination unit with respect to signals, and at least one optical display device which is coupled with the image determination unit with respect to signals, and which is designed for receiving and for signaling the signalization signal determined by the image determination unit.

In an advantageous further development of the fourth aspect, the optical display device is coupled in a signal-related manner with the image determination unit by way of a specified multimedia interface. This permits an efficient and reliable transmission of the determined signalization signal.

Supplementary advantageous further developments of the first to third aspect here also apply to the fourth aspect.

In the following, embodiments of the invention will be explained by means of the schematic drawings.

Other objects, advantages and novel features of the present invention will become apparent from the following detailed description of one or more preferred embodiments when considered in conjunction with the accompanying drawings.

BRIEF DESCRIPTION OF THE DRAWINGS

Elements of the same construction or function are provided with the same reference numbers with respect to all figures.

DETAILED DESCRIPTION OF THE DRAWINGS

Figure 1:
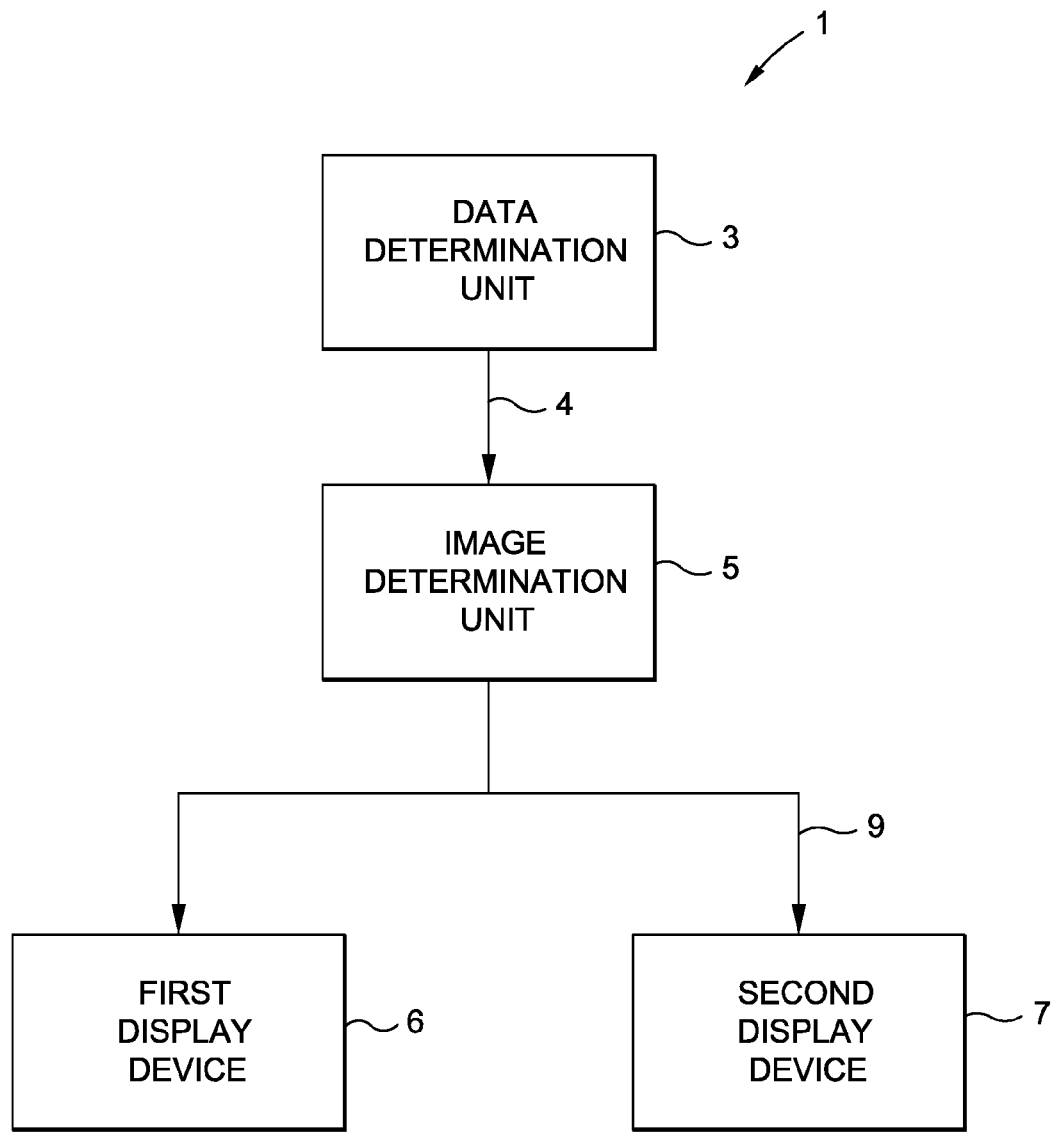
FIG. 1 is a schematic block diagram for a display system of a vehicle.

FIG. 1 illustrates an embodiment of a display system 1 of a vehicle. The display system 1 has a data determination unit 3 and an image determination unit 5 as well as at least one optical display device. In the embodiment illustrated in FIG. 1, the display system 1, for example, has a first display device 6 and a second display device 7.

The first display device 6, for example, comprises a video screen. The video screen may, for example, be designed as a liquid-crystal display, also called LC display. The first display device may particularly be arranged in an instrument cluster of the vehicle.

The second display device, for example, comprises a head-up display 10. An embodiment of the head-up display 10 is illustrated in detail in FIG. 2.

The data determination unit 3 illustrated in FIG. 1, for example, comprises a central processing unit of the vehicle, also called head unit. The data determination unit 3 may, for example, comprise a navigation device. The data determination unit 3 is designed for determining a dataset as a function of a piece of specified navigation information, the dataset having a specified metadata structure which is suitable for textually characterizing the navigation information. Furthermore, the data determination unit 3 is designed for sending the dataset by way of a specified communication interface 4.

In this case, the navigation information may, for example, comprise any type of information that is suitable for assisting a vehicle driver when controlling the vehicle.

The data determination unit 3 is, for example, designed for determining a driving instruction as a function of a determined and/or received actual position of the vehicle and digital map data and as a function of a desired destination and/or a determined route. As a function of the determined driving instruction, the data determination unit 3 determines the dataset with the specified metastructure, the dataset textually characterizing the determined driving instruction. The data of the navigation are therefore not made available in the form of plot commands or as picture-in-picture contents but in the form of metadata. For example, no plot command or video image for a turn arrow are therefore transmitted but only the attribute information of a driving instruction. This can, for example, take place in the following textual specified metadata structure;

<Action>; <direction element>; <distance>

For example
"turn off to the right after 200 m"
"change to the right driving lane after 300".

In addition or as an alternative, it is possible to abbreviate the description by means of a coding. For example, the following description elements may be used:

EXAMPLE 1

Name: Type of Direction Element
Description: Basic Type of Driving Maneuver

Possible Values:
1 Straight ahead
2 Slightly left
3 Slightly right
4 Hard left
5 Hard right
6 Left
7 Right
8 Turn left
9 Turn right

EXAMPLE 2

Name: Type of Turn-off Element
Description: Type of Turn-off
Possible Values:
1 Junction (2 roads)
2 Junction (3 roads)
3 Exit

EXAMPLE 3

Name: Geo-coordinates
Description: Defines a geographic position.

| Attribute Name | Possible Values | Unit |
|---|---|---|
| Latitude | 8-byte floating point number | degree |
| Longitude | 8-byte floating point number | degree |
| Altitude | 2-byte integer | m |

The image determination unit 5 is coupled with respect to signals by way of the communication interface 4 with the data determination unit 3 and is designed for receiving the dataset sent by the data determination unit 3, which is transmitted by way of the specified communication interface 4.

The communication interface 4 may comprise a network connection and/or a line connection of the vehicle. The communication interface 4 may have a unidirectional or bidirectional design. The data determination unit 3 and the image determination unit 5 may be arranged in different processing devices or, for example, use a common processor.

The image determination unit 5 is coupled with respect to signals with the first display device 6 and the second display device 7. The image determination unit 5 is designed for determining, as a function of the received dataset, pixel values for at least one portion of pixels of a digital image and/or of a graphic element, and determining a signalization signal for signaling the pixel values of the pixels by means of the optical display device.

The image determination unit 5 is, for example, designed for determining as a function of specified route data and/or specified environment data, a three-dimensional model for a specified environment of the vehicle. Furthermore, the image determination unit 5 is designed for determining the pixel values for the at least one portion of the pixels of the digital image and/or of the graphic element as a function of the three-dimensional model.

The route data and/or environment data can, for example, be made available by a further vehicle device and/or the data determination unit 3 and/or by the image determination unit 5. The image determination device 5 may be designed, for example, for determining, as a function of the acquired environment data, environment model data which represent a specified environment of the vehicle. With respect to signals, the image determination unit 5 is, for example, coupled with one or more sensor units. The respective sensor units are designed for acquiring environment data of the vehicle. The respective sensor unit may have an optical acquisition device, such as a video camera, and/or a radar sensor and/or an ultrasound sensor and/or a Lidar sensor. The route data may, for example, be provided by the navigation device.

As an alternative or in addition, the route data and/or environment data in the form of datasets, which have the metadata structure, may be provided to the image determination unit 5, for example, by the data determination unit 3.

The signalization signal determined by the image determination unit 5 is sent, for example, to the first display device 6 and/or to the second display device 7.

With respect to signals, the image determination unit 5 is coupled with the at least one optical display device. For example, by way of a specified multimedia interface 9, the image determination unit 5 is coupled with the first display device 6 and/or the second display device 7. The multimedia interface 9 may, for example, comprise a high-definition multimedia interface.

Figure 2:
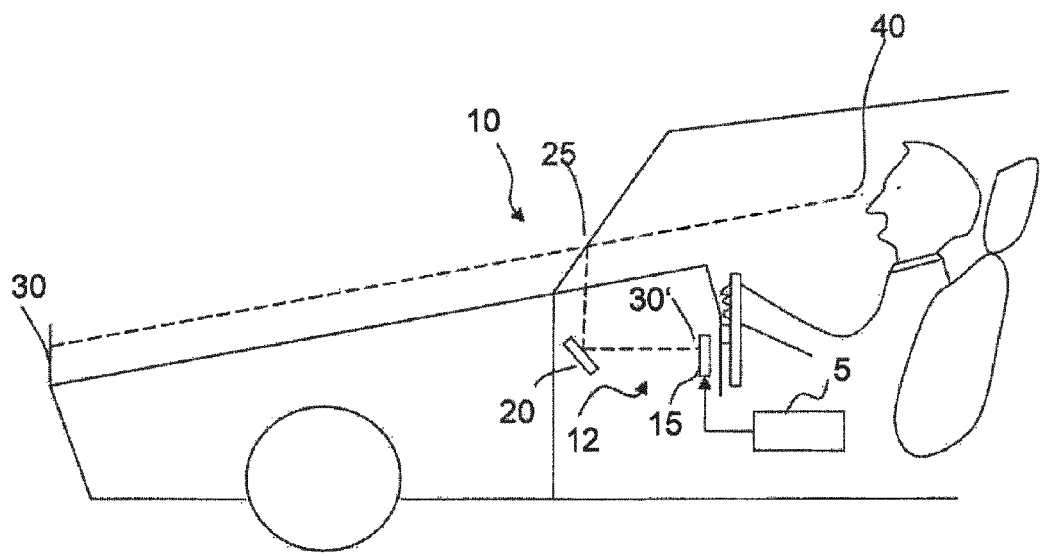
FIG. 2 is a view of a head-up display for the vehicle.

FIG. 2 illustrates an embodiment of a head-up display 10.

The head-up display 10 comprises an image generating device 12 for generating a virtual image 30. The image generating device 12 comprises a display 15 for generating a real image 30' and an optical system for generating the virtual image 30. The optical system comprises an imaging first mirror 20 and second mirror 25. A real image 30' generated by the display 15 is first directed onto the first mirror 20 and is projected from the first mirror 20 onto the second mirror 25. The second mirror 25 may be designed as a windshield of a vehicle 1.

From a driver's specified eye box 40, the virtual image 30 will appear at a distance in front of the windshield, for example, at the end of the engine hood. The virtual image 30 can generally be seen only from a defined area, the so-called eye box 40. The eye box 40 is usually laid out such that the complete virtual image 30 can be seen from the entire desired eye box area.

Static display contents, which are permanently or frequently displayed, can be displayed in the virtual image 3. Furthermore, the image generating device 12 may be designed such that image contents are displayed in the virtual image 30, which are displayed only according to the situation and for a short time. In particular, the head-up display 10 may be designed as a contact-analogous head-up display 10. In the case of the head-up display, a differentiation is made between a contact-analogous and a non-contact-analogous representation. Contact-analogous representation forms enrich the environment perceived by the driver by superimposing an artificially generated setting. In contrast, non-contact-analogous representation forms represent information without any direct reference to the environment.

The image determination unit is, for example, designed for determining the pixel values of the graphic element as a function of the dataset and the three-dimensional model and causing them to be displayed on the specified display field of the head-up display 10 such that a viewer of the display field will perceive the graphic element from a specified viewing position with direct reference to the real environment of the vehicle.

LIST OF REFERENCE NUMBERS

1 Display system
3 Data determination unit
4 Communication interface
5 Image determination unit 6 First display device
7 Second display device
9 Multimedia interface
10 Head-up display
12 Image generating device
15 Display
20 First mirror
25 Second mirror
30 Virtual image
30' Real image
40 Eye box The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating an optical display device of a vehicle, wherein
    a dataset is determined as a function of a specified navigation information, the dataset having a specified metadata structure which is suitable for textually characterizing the navigation information, wherein the dataset consists of only non-graphic text data,
    the dataset is transmitted by way of a specified communication interface and, as a function of the dataset received by way of the communication interface, pixel values are determined for at least a portion of pixels of a digital image and/or a graphic element, and
    a signalization signal is determined for signaling the pixel values of the pixels by means of the optical display device.

2. The method according to claim 1, wherein the navigation information comprises a driving instruction for a vehicle user.

3. The method according to claim 1, wherein as a function of specified route data and/or specified environment data, a three-dimensional model is determined for a specified environment of the vehicle, and
    the pixel values for the at least one portion of the pixels of the digital image and/or of the graphic element are determined as a function of the three-dimensional model.

4. The method according to claim 2, wherein as a function of specified route data and/or specified environment data, a three-dimensional model is determined for a specified environment of the vehicle, and
    the pixel values for the at least one portion of the pixels of the digital image and/or of the graphic element are determined as a function of the three-dimensional model.

5. The method according to claim 3, wherein the optical display device comprises a head-up display with a specified display field, and
    the pixel values of the graphic element are determined such as a function of the dataset and the three-dimensional model and are displayed on the display field that a viewer of the display field perceives the graphic element from a specified viewing position with a direct reference to the real environment of the vehicle.

6. The method according to claim 4, wherein the optical display device comprises a head-up display with a specified display field, and
    the pixel values of the graphic element are determined such as a function of the dataset and the three-dimensional model and are displayed on the display field that a viewer of the display field perceives the graphic element from a specified viewing position with a direct reference to the real environment of the vehicle.

7. A data determination unit configured to:
    determine a dataset as a function of a specified navigation information, the dataset having a metadata structure which is suitable for textually characterizing the navigation information, wherein the dataset consists of only non-graphic text data; and
    send the dataset by way of a specified communication interface.

8. An image determination unit, which can be coupled with respect to signals with an optical display device of the vehicle, configured to:
    receive a specified dataset which is transmitted by way of a specified communication interface, wherein the dataset consists of only non-graphic text data,
    as a function of the received dataset, determine pixel values for at least a portion of pixels of a digital image and/or of a graphic element, and
    determine a signalization signal for signaling the pixel values of the pixels by means of the optical display device.

9. The image determination device according to claim 8, further configured to:
    determine, as a function of specified route data and/or specified environment data, a three-dimensional model for a specified environment of the vehicle, and
    determine the pixel values for the at least one portion of the pixels of the digital image and/or of the graphic element as a function of the three-dimensional model.

10. The image determination unit according to claim 9, wherein the optical display device comprises a head-up display with a specified display field, and wherein the image determination unit is configured to:
    determine the pixel values of the graphic element as a function of the dataset and the three-dimensional model and causing them to be displayed on the specified display field of the head-up display such that a viewer of the display field will perceive the graphic element from a specified viewing position with direct reference to the real environment of the vehicle.

11. A display system for a vehicle comprising:
    a data determination unit configured to determine a dataset as a function of a specified navigation information, the dataset having a metadata structure which is suitable for textually characterizing the navigation information, and further configured to send the dataset by way of a specified communication interface;
    an image determination unit, which can be coupled with respect to signals with an optical display device of the vehicle, the image determination unit configured to:
        receive a specified dataset which is transmitted by way of a specified communication interface, wherein the dataset consists of only non-graphic text data,
        as a function of the received dataset, determine pixel values for at least a portion of pixels of a digital image and/or of a graphic element, and
        determine a signalization signal for signaling the pixel values of the pixels by means of the optical display device;
    a specified communication interface which, with respect to signals, couples the data determination unit and the image determination unit; and
    at least one optical display device which is coupled, with respect to signals, with the image determination unit and which is designed for receiving a signalization signal determined by the image determination unit and for signalizing.

12. The display system according to claim 11, wherein the optical display device is coupled with respect to signals with the image determination unit by way of a specified multimedia interface.

\* \* \* \* \*